No. 886,299. PATENTED APR. 28, 1908.
W. F. KENNEY.
NUT LOCK.
APPLICATION FILED OCT. 21, 1907.
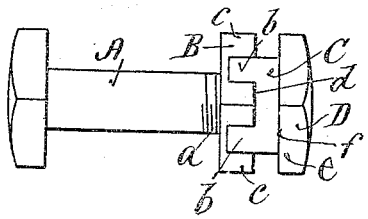
FIG.1.
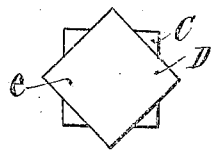
FIG.2.
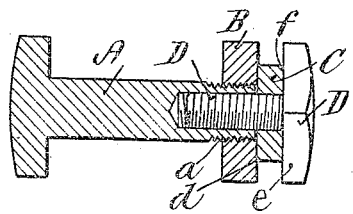
FIG.3.
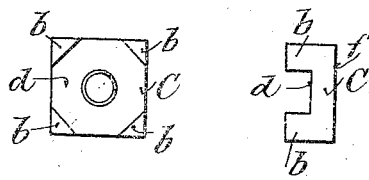 
FIG.4. FIG.5.
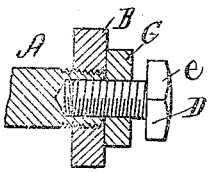
FIG.6.
WITNESSES
John W. Weeks
Stuart H. Swallow
INVENTOR
William F. Kenney
per S. Scholfield
ATTORNEY

UNITED STATES PATENT OFFICE.

WILLIAM F. KENNEY, OF PROVIDENCE, RHODE ISLAND.

NUT-LOCK.

No. 886,299.   Specification of Letters Patent.   Patented April 28, 1908.

Application filed October 21, 1907. Serial No. 398,523.

*To all whom it may concern:*

Be it known that I, WILLIAM F. KENNEY, a citizen of the United States, residing at Providence, in the State of Rhode Island, have invented a new and useful Improvement in Nut-Locks, of which the following is a specification.

The nature of my invention consists in the improved arrangement of right and left hand threads, as a means for locking the nut upon the bolt.

In the accompanying drawing:—Figure 1 represents a side view of a bolt and locking nut embodying my invention. Fig. 2 represents an end view of the same. Fig. 3 represents an axial section. Fig. 4 represents a face view of the locking nut. Fig. 5 represents an edge view of the same. Fig. 6 represents an axial section, showing the head of the tightening screw at a position away from the side of the locking nut.

In the drawing A represents the bolt provided with the external right hand screw thread a, and B the right hand screw threaded nut.

C is a left hand screw threaded locking nut provided at its side with the lateral projections b, b, which are adapted to fit over the edge faces c, c, of the nut B, as clearly shown in Fig. 2. The bolt A is bored out and screw threaded to receive the left hand screw-threaded set screw D, which also fits the left hand screw-threaded bore of the nut C.

The length of the bolt A is made to conform to the requirements of the particular case in which it is to be used, and the nut B screwed up thereon to the required degree of tightness, then the locking nut is to be placed with its inner face d in close contact with the outer face of the nut B, as shown in Fig. 3, and then the set screw D inserted into the bore of the locking nut C and screwed forward until it enters the bore of the bolt A, and then screwed up tight until the head e of the set screw bears tightly against the outer side f of the locking nut. Then the unscrewing of the nut B from the right hand screw threaded end of the bolt A will be resisted by the action of the left hand screw threaded locking nut C and set screw D, so that the nut A of the bolt will be positively locked against all unscrewing movement.

When the nut B is tightened up to a position which does not allow the screw threads of the locking nut C and of the bore of the bolt to coincide, then the head e of the set screw will not be brought up against the side of the locking nut; by reason of the gradual tightening of the displaced screw threads to a degree sufficient to lock the nut B against outward movement as shown in Fig. 6 and in such case, the locking nut C may be shifted around to the proper position relatively to the nut B, for causing the tightening of the threads.

I claim as my invention:—

1. The combination of a bolt provided with an external screw thread and a reversely screw-threaded bore, and the bolt nut fitting the said external screw thread, with a set screw engaging with the screw thread of the bore of the bolt, and the locking nut arranged exteriorly of the end of the bolt in screw-threaded engagement with the set screw and also in locked engagement with the bolt nut, substantially as described.

2. The combination of a bolt provided with an external screw thread, and with a reversely screw-threaded bore, and the bolt-nut, with a set screw adapted to enter the bore of the bolt, the locking nut fitting the threads of the set screw and engaging with the bolt-nut, and means for adjusting the said locking-nut relatively to the bolt-nut so that the set screw may be caused to enter the bore of the bolt with the proper binding fit between the threads, substantially as described.

WILLIAM F. KENNEY.

Witnesses:
SOCRATES SCHOLFIELD,
JOHN W. WEEKS.